UNITED STATES PATENT OFFICE.

JOHN F. STEENMEYER, OF HULL, IOWA, ASSIGNOR OF FOUR-TENTHS TO THEODORE STEENSMA, OF HULL, IOWA.

PAINT COMPOSITION.

1,414,597.   Specification of Letters Patent.   Patented May 2, 1922.

No Drawing.   Application filed August 15, 1921. Serial No. 492,595.

*To all whom it may concern:*

Be it known that I, JOHN F. STEENMEYER, a citizen of the United States, and resident of Hull, in the county of Sioux and State of Iowa, have invented certain new and useful Improvements in Paint Compositions, of which the following is a specification.

This invention has reference to an improved paint composition and more especially to what is known as "flat paint."

The invention contemplates a new paint composition adapted to replace and having many advantages over ordinary flat paint, in that it is harmless to the user or painter to work with, is more durable, is washable and very easy to brush out, can be put on walls, as well as woodwork and used as a primer or undercoat for enamel or finish paint and is of better quality in addition to being no more expensive, if not cheaper than ordinary flat paints, as well as capable of being made in any color.

In the method of preparing the paint, the following formula of ingredients is used in their exact proportions according to the steps to be hereinafter enumerated.

Formula.

|   | Parts by weight. |
|---|---|
| Composition of pigments: | |
| Zinc oxide | 100 |
| Composition of liquid: | |
| Raw or boiled linseed oil | 47 |
| Petroleum | 45 |
| Banana oil | 3 |
| Japan drier | 5 |

In mixing the composition, according to the proportions above enumerated, for preparing a given quantity of paint, the following example may be followed.

Take the 47 parts or ounces of raw linseed oil with 5 ounces of petroleum and add the 100 ounces of zinc oxide to the 52 ounces of the liquid. This combination is thoroughly ground or pulverized in order to produce a smooth paint.

After the grinding operation, the remaining 40 oz. or parts of petroleum, the 3 oz. of banana oil and 5 oz. of japan drier are added to the previous mixture and thoroughly stirred and intermixed. The paint is then ready for use.

It is also to be understood that the boiled linseed oil may be used instead of the raw linseed oil and that in lieu of Pennsylvania petroleum, any good grade of petroleum can be used, though Pennsylvania petroleum has been found to be more efficacious. The banana oil is used for the purpose of overcoming the odor or smell of the petroleum and render the paint less injurious or harmless to the user. In this manner, a very effective and desirable flat paint possessing the advantages heretofore specified is produced. It is also to be understood that any color of pigment may be employed in lieu of zinc oxide, dry color powders being employed therewith. However, in each instance, the proportions of the liquid and other ingredients remain the same.

I claim:

1. A paint composition consisting of the following ingredients in substantially the proportions stated: zinc oxide 100 parts, linseed oil 47 parts, petroleum 45 parts, amyl acetate 3 parts and drier 5 parts.

2. A paint composition consisting of a pigment suitably colored of powdered zinc oxide 100 parts, raw linseed oil 47 parts, petroleum 45 parts of good grade, banana oil 3 parts and japan drier 5 parts.

3. The method of preparing paint consisting in adding to 47 parts of linseed oil, 5 parts of petroleum, and 100 parts of zinc oxide, the mixture being ground to produce a smooth paint and then adding 40 parts of petroleum, 3 parts of banana oil and 5 parts of japan drier.

4. The method of producing paint composition consisting in adding to 47 parts of raw or boiled linseed oil and 5 parts of petroleum, 100 parts of zinc oxide or other suitable pigment, grinding the mixture thus produced to a powder of smooth consistency, and then adding 40 parts of petroleum, 5 parts of drier and 3 parts of banana oil or the like, the mixture being thoroughly stirred.

5. A paint composition comprising a pigment suitably colored 100 parts, linseed oil 47 parts, petroleum 45 parts and drier 5 parts.

JOHN F. STEENMEYER.